US008316358B2

(12) United States Patent
Chen et al.

(10) Patent No.: US 8,316,358 B2
(45) Date of Patent: Nov. 20, 2012

(54) METHOD AND APPARATUS FOR PROCESSING XML FOR DISPLAY ON A MOBILE DEVICE

(75) Inventors: Jack Chen, Milton (CA); David Weintraub, Thornhill (CA); Jian Frank Li, Mississauga (CA)

(73) Assignee: Research In Motion Limited, Waterloo (CA)

( * ) Notice: Subject to any disclaimer, the term of this patent is extended or adjusted under 35 U.S.C. 154(b) by 1573 days.

(21) Appl. No.: 11/755,781

(22) Filed: May 31, 2007

(65) Prior Publication Data
US 2008/0300850 A1     Dec. 4, 2008

(51) Int. Cl.
*G06F 9/45* (2006.01)
(52) U.S. Cl. ....................................................... 717/143
(58) Field of Classification Search .................. 717/135, 717/143
See application file for complete search history.

(56) References Cited

U.S. PATENT DOCUMENTS

| 7,554,576 B2 * | 6/2009 | Erol et al. .................. 348/211.3 |
| 7,583,410 B1 * | 9/2009 | Anup et al. ..................... 358/2.1 |
| 7,600,183 B2 * | 10/2009 | Stern et al. ..................... 715/243 |
| 2004/0172591 A1 | 9/2004 | Rothschiller et al. |

OTHER PUBLICATIONS

Wang et al: "A space efficient XML DOM parser" Data & Knowledge Engineering, vol. 60, No. 1, Nov. 9, 2006, pp. 185-207, XP005754717.

* cited by examiner

*Primary Examiner* — John Chavis
(74) *Attorney, Agent, or Firm* — Perry + Currier Inc.; Kristjan Spence

(57) ABSTRACT

A method and apparatus are set forth for creating a Document Object Model of an XML document of predetermined type, comprising a first process for receiving and opening a compressed input file containing the XML document; a second process for opening and parsing the contents of a relationships file to create a map of name-value pairs and detecting a value for identifying the predetermined type from among a plurality of types of XML documents; and a further process for parsing data in the XML document according to the predetermined type, and building the Document Object Model.

10 Claims, 3 Drawing Sheets

METHOD AND APPARATUS FOR PROCESSING XML FOR DISPLAY ON A MOBILE DEVICE

BACKGROUND

1. Field

The following is directed in general to displaying content on mobile communication devices, and more particularly to a method and apparatus for processing XML documents for display on a mobile communication device.

2. Description of the Related Art

Mobile communication devices have become extremely popular for business and personal use due to numerous services and features that the devices and mobile infrastructures are able to support. Handheld mobile communication devices are essentially portable computers having wireless capability, and come in various forms. These include Personal Digital Assistants (PDAs), cellular phones and smart phones. One important capability of such mobile communication devices is the ability to view documents, such as word processing documents, spreadsheets and presentations. While the compact size of such mobile communication devices is an advantage to portability, limitations in download bandwidth give rise to challenges in viewing large documents.

Various file format specifications exist for the storage of electronic documents. A recently developed specification, Office Open XML (commonly abbreviated as OOXML), was developed by Microsoft Corporation for its Microsoft Office 2007 product suite. The Office Open XML specification was standardized as Ecma 376 in December 2006. Office Open XML uses a ZIP container for packaging XML and other data files. The Office Open XML file is an Open Packaging Convention (OPC) package containing the individual files that form the basis of the document. In addition to XML files with Office markup data, the ZIP package can also include embedded (binary) files in formats such as PNG, BMP, AVI and PDF.

Windows Mobile™ uses a client application residing on each mobile communication device to read and parse Office Open XML documents. Therefore, in order to provide for presentation of such documents, the client application must be installed/updated on each mobile communication device. When a document forms an attachment to an email, Windows Mobile™ devices must download the entire attachment in order for the client application to read and parse the document. This can be a very time-consuming procedure, especially when the document is large, and may be inconvenient for a user who wishes to view only a portion of the document.

Aspects and advantages which will be subsequently apparent, reside in the details of construction and operation as more fully hereinafter described and claimed, reference being had to the accompanying drawings forming a part hereof, wherein like numerals refer to like parts throughout.

DETAILED DESCRIPTION

It is an aspect of the this specification to set forth a method and apparatus to view Office Open XML documents on a mobile communication device, without requiring installation or updating of a dedicated document reader application on the device, and without requiring downloading of an entire document to the device before the document can be viewed.

The above aspects can be attained by a method and apparatus for creating a Document Object Model of an XML document of predetermined type, comprising a first process for receiving and opening a compressed input file containing the XML document; a second process for opening and parsing the contents of a relationships file to create a map of name-value pairs and detecting a value for identifying the predetermined type from among a plurality of types of XML documents; and a further process for parsing data in the XML document according to the predetermined type, and building the Document Object Model.

Figure 1:
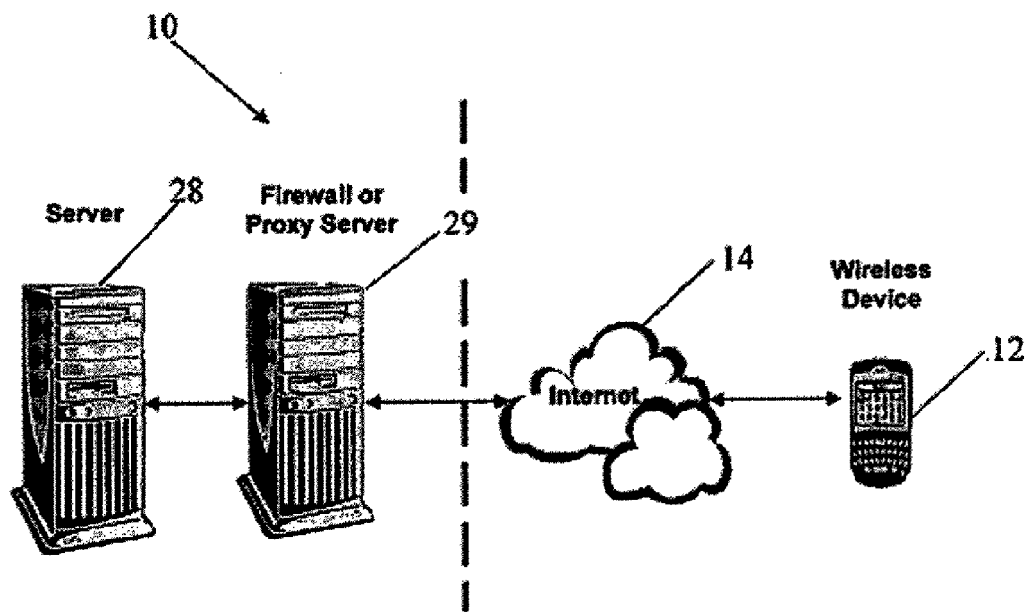
FIG. 1 is a block diagram of a network environment that includes an attachment server and at least one mobile communication device, in which the preferred embodiment may be practiced.

With reference to FIG. 1, network environment 10 is shown in which the preferred embodiment may be practiced. Network environment 10 includes at least one mobile communication device 12 communicating via a wireless network/Internet 14 to a server 28, via a firewall security server 29, for downloading document attachments to the devices 12. While only one server 28 is shown for illustration purposes, a person of skill in the art will understand that network environment 10 could have many such servers for hosting web sites or graphic download sites, providing access to picture files such as JPEG, TIFF, BMP, PNG, SGI, MP4, MOV, GIF, SVG, etc. As would be understood by one of ordinary skill in the art, wireless networks 14 include GSM/GPRS, CDPD, TDMA, iDEN Mobitex, DataTAC networks, or future networks such as EDGE or UMTS, and broadband networks like Bluetooth and variants of 802.11.

The attachment server 28 uses a file-parsing distiller in the preferred embodiment, as discussed in greater detail below, to build an in-memory Document Object Model (DOM) structure representing an attachment of the document. The document DOM structure is stored in a memory cache of server 28, and can be iterated bi-directionally.

The Document Object Model (set forth in the various W3C specifications) is an application programming interface (API) for HTML and XML documents. It defines the logical structure of documents and the way a document is accessed and manipulated. In the DOM specification, the term "document" is used in the broad sense—increasingly, XML is being used as a way of representing many different kinds of information that may be stored in diverse systems, and much of this would traditionally be seen as data rather than as documents. Nevertheless, XML presents this data as documents, and the DOM may be used to manage this data.

As is known from W3C specifications and other sources, the graph-based document DOM structure consists of nodes and leaves. The nodes serve as the parents of leaves and nodes, while leaves are end points of a branch in the graph. Each node and leaf can have a set of attributes to specify its own characteristics. For example, a paragraph node can contain attributes to specify its alignment, style, entry of document TOC, etc. In addition, each of the nodes and the leaves has a unique identifier, called a DOM ID, to identify itself in the document DOM structure.

The document DOM structure is divided into three parts: top-level, component and references. The top level refers to the document root structure, while the main document is constructed in the component and the references represent document references to either internal or external sub-document parts. The following paragraphs examine each part in detail.

The root node of a document DOM structure, referred to as "Document", contains several children nodes, referred to as "Contents", which represent different aspects of the document contents. Each "Contents" node contains one or multiple "Container" nodes used to store various document global attributes. The children of the "Container" nodes are components, which store the document structural and navigational information. When the attachment server 28 builds the DOM structure for an attachment file for the first time, the top-level structure is a single parent-child chain.

Three types of components are defined by the attachment server 28: text components, table components and image components, which represent text, tables and images in a document, respectively.

A component consists of a hierarchy of command nodes. Each command represents a physical entity, a property, or a reference defined in a document. For the text component, the physical entity commands are page, section, paragraph, text segments, comments, footnote and endnote commands, which by name define the corresponding entity contained in a document. The property commands for the text component are font, text color, text background color, hyperlink start/end and bookmark commands. The text component has only one reference command, referred to as the text reference command, which is used to reference a subdocument defined in the main body of a document. Usually, the children of a text component are page or section command nodes that, in turn, comprise a set of paragraph command nodes. The paragraph command can contain one or multiple nodes for the remaining command types.

Returning now to FIG. 1, the client application on device 12, requests a document attachment conversion from the server 28, and informs the server of its device and feature specific capabilities such as screen size, color capabilities and functionality support when requesting an operation. This allows the server 28 to tailor its response to the requesting device 12 and optimize bandwidth utilization and minimize device CPU/storage usage while preserving the device presentation capabilities (e.g. color presentation data will not be returned to a monochrome device and vice versa).

When the attachment server 28 receives a document (e.g. as an attachment to an email), it first constructs the DOM structure for the document if it does not already exist in the in-memory DOM structure cache. In this way, the attachment server receives commands from the device 12 to convert different kinds of document to a universal format (referred to as UCS) which the attachment viewer application on the device 12 can understand. The attachment server uses distillers, decorators and commands modules to accomplish document conversion. The commands module receives and processes commands from the device 12, and the distillers parse the document, convert it to a DOM tree, and persist the DOM in memory. After that, the decorators module retrieves the requested data for the command from the DOM and extracts content or navigational information such as Table of Content (TOC), Bookmarks, Hyperlinks, Find Text, etc.

Microsoft Office 2007™ supports Word™, Excel™ and PowerPoint™ documents. Decorator and command modules are known in the art for supporting these three kinds of document, and the operation thereof is not described in detail herein. However, as set forth herein below three new loading distillers are provided.

Figure 2:
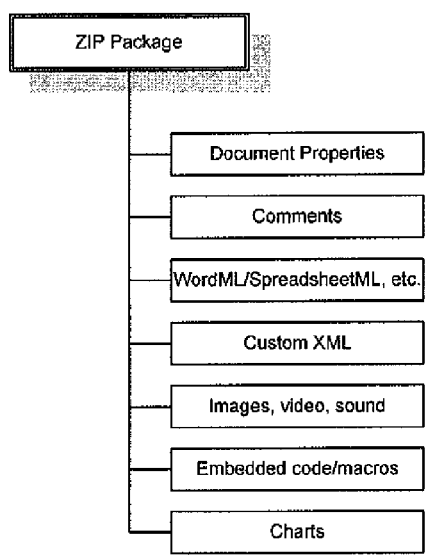
FIG. 2 shows the Office Open XML formats file container.

FIG. 2 shows the Open XML file format container according to the Ecma standard. The Open XML file format container is based on a simple compressed ZIP file format specification. At the core of the Office XML format is the use of XML reference schemas and a ZIP container. Each file is comprised of a collection of any number of parts; this collection defines the document. ZIP handling and basic Open XML document handling are shared for the three distillers set forth in greater detail below. The file structure shown in FIG. 2 comprises a ZIP Package (container) with compression, document parts that define the document, non-XML document parts, such as binary images or OLE objects, relationship parts that define the file structure, and subdirectories that help to structure the document files.

As discussed above, Office Open XML files conform to the Open Packaging Convention (OPC) and different applications have characteristic directory structures and file names within these packages. An OPC-aware application uses relationships files rather than directory names and file names to locate individual files. In OPC terminology, a file is a "part", and a "part" also has accompanying metadata, in particular MIME metadata.

Each file is composed of a collection of any number of "parts". This collection of parts and their relationship parts are what define the document. Document parts are held together by the container (package) using the industry standard ZIP format. Most parts are simply XML files that describe application data, metadata, and customer data stored inside the container.

A basic Office Open XML file contains a Content Types file at the root level of the ZIP package, and three folders: (1) Document Relations, (2) Document Properties, and (3) a directory specific to the document type (for example, in a .docx word processing file a word directory is provided, which contains the word/document.xml file that is the core content of the document).

The Content Types file describes the content of the ZIP package. It also contains a mapping for file extensions and overrides for specific URIs. The Document Relations folders contain the relationships for any given part within the package. Whereas parts are the individual elements that make up an Office document, relationships specify how the collection of parts come together to form the actual document. Relationships are defined by using XML, which specifies the connection between a source part and a target resource. For example, the connection between a slide and an image that appears in that slide is identified by a relationship. Relationships themselves are stored within XML parts or "relationship parts" in the document container. If a source part has multiple relationships, all subsequent relationships are listed in the same XML relationship part.

The root level Document Relations folder always contains a part called .rels. The URIs (/_rels/.rels) and /[Content_Types].xml are the only two reserved URIs for parts in files that adhere to Office Open XML conventions. This is where the "package relationships" are located. The process of opening a file using these conventions always starts with the _rels/rels file. All relationship files are represented with XML. If the file is opened in a text editor, one will see a plurality of XML that outlines each relationship for that part. In a minimal word document containing only the basic document.xml, the top level parts are two metadata parts, and the document.xml part.

The word/document.xml file is the main part of any Word document that, when viewed in an XML editor, appears as a basic XML file. The body of the word processing document is contained in this part.

Relationship files allow navigation of the package without having to open up each part. In Office Open XML, all references are done via relationships. For example a document.xml part has a relationship to the image part. The actual URI is located by the corresponding item in the accompanying relationships file. There is a _rels folder in the ZIP package, in the same directory as document.xml. Inside _rels is a file called document.xml.rels. In this file is a relationship definition that contains a type, an ID and a location. The ID is the referenced ID used in the XML document. The type is a reference schema definition for the media type and the location is an internal location within the ZIP package or an external location defined with an URL.

Figure 3:
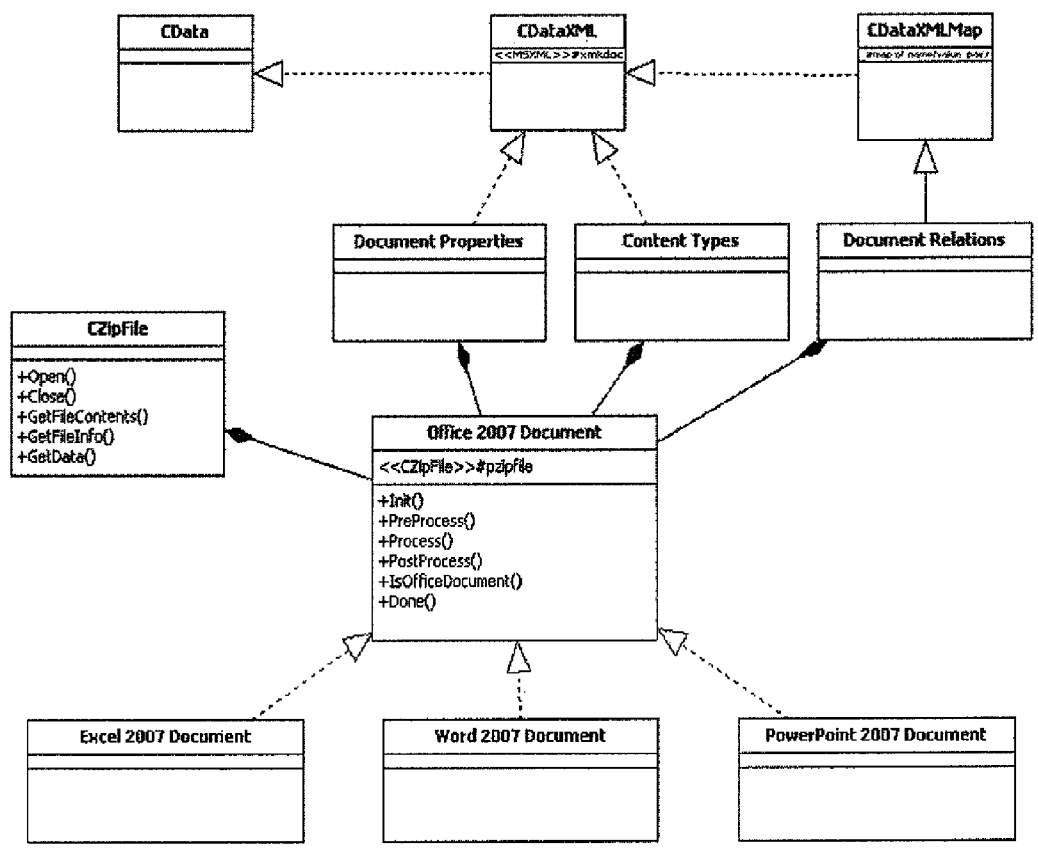
FIG. 3 is basic class diagram for Office Open XML document handling, according to the preferred embodiment.

FIG. 3 is a Unified Modelling Language (UML) class diagram that provides an overview of the structure according to the preferred embodiment for processing Office Open XML files (e.g. Excel 2007 documents, Word 2007 documents and Presentation 2007 documents).

Class CZipFile is a standalone class that implements ZIP file handling using the Open Source ZLIB library. This class publishes several interface functions to manipulate ZIP file contents. The most used interface function is GetData, which accepts a reference to a CData class object and populates it using its internal data (filename) as an input to identify which file to unzip. The CZipFile class implements a state machine for ensuring data is valid, properly analyzed and processed, and prevents accessing incomplete or bad data or accessing when an operation with the class data is in progress. The class has a locking mechanism to prevent simultaneous access in multithreading runtime environments.

Class CData is the base class of the class hierarchy and implements the most basic functionality shared between all classes derived from it. The CData class holds the associated file name, file info and raw buffer of file contents. This class implements a state machine that ensures data is valid, properly analyzed and processed, and also prevents accessing incomplete or bad data or accessing when an operation with the class data is in progress. The CData class also has a locking mechanism to prevent simultaneous access in multithreading runtime environments.

Class CDataXML inherits all of the functionality of CData and adds XML handling. It uses Microsoft XML Core Services (MSXML) to parse and build an XML DOM tree that it later uses for processing. The CDataXML class also publishes several static functions to simplify data extraction from XML.

Class CDataXMLMap inherits all of the functionality of CDataXML and in addition builds a map of name-value pairs, which is the most common data relation used in Office Open XML files. The map is built during processing of the associated XML file using tag names provided in the virtual function. The CDataXMLMap class publishes several interface functions to get data from the map in an easy and simple manner.

Document Properties (formally defined as class CDataXMLCore) inherits all of the functionality of CDataXML and in addition publishes interface functions for providing easy and simple access to document properties such as Author, Title, Date Created and Last Modified. The data is extracted and saved in protected class variables during the associated XML file processing.

Content Types (formally defined as class CDataXMLContentTypes) inherits all of the functionality of CDataXML, saves the contents of the ZIP archive and publishes interface functions for easy and simple access to the document contents.

Document Relations (formally defined as class CDataXMLRels) inherits all of the functionality of CDataXMLMap and builds a map between reference ids used in an XML file to actual XML files. Almost every XML file in Office Open XML has a corresponding XML file with defined relations.

Office 2007 Document (formally defined as class CMSO2007Doc) is a standalone class that acts as the base class for all Office 2007 documents and also as a container for all objects that are shared between Office 2007 documents such as Content Types, Document Relations and Document Properties. The CMSO2007Doc class implements a state machine that ensures data is valid, properly analyzed and processed, and also prevents accessing incomplete or bad data or accessing when an operation with the class data is in progress. The CMSO2007Doc class also has a locking mechanism to prevent simultaneous access in multithreading runtime environments.

Excel 2007 Document (formally defined as class CMSO2007Excel) inherits all of the functionality of CMSO2007Doc and adds processing functionality to parse the Office Open Excel 2007 XML files.

Word 2007 Document (formally defined as class CWord2007Parser) inherits all of the functionality of CMSO2007Doc and adds processing functionality to parse the Office Open Word 2007 XML files.

PowerPoint 2007 Document (formally defined as class CPowerPoint2007) is a standalone class that implements all of the functionality needed to parse PowerPoint 2007 documents. It functions as a container to many objects, similar to CMSO2007Doc.

In general, upon receipt of an Office 2007 document, the server 28 performs three operations. First, it first analyzes and parses the XML files using a plurality of distillers, where each distiller parses input files of one or more file types and builds data structures in memory. Second, the distiller traverses the data structure and creates a corresponding DOM tree using a predefined set of DOM tree elements. The DOM contains textual content, font, style and formatting attributes as well as layout attributes, such as page/slide size, positioning information (i.e. x, y and z coordinates on the page/slide), embedded graphics and tables, for example. The DOM structure is disclosed in United States Patent Application No. 2006/0055693, which is herein incorporated by reference. Finally, the DOM tree is passed to a decorator module for converting predefined DOM tree elements to USC format for transmission to the mobile communication device 12.

Figure 4:
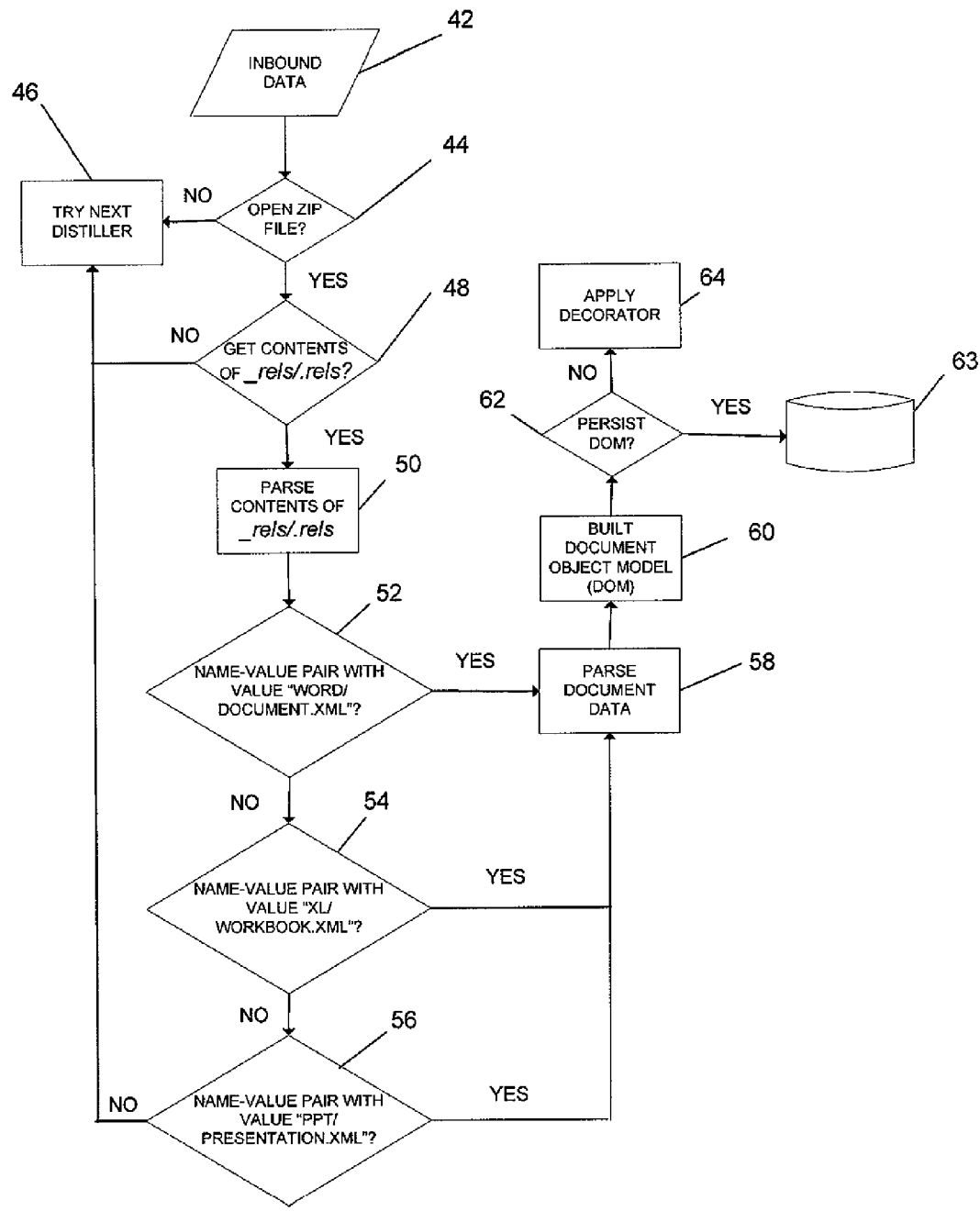
FIG. 4 is a flowchart showing server-side operation of a method for requesting and displaying a rendered attachment on the mobile communication device of FIG. 1.

More particularly, with reference to the flowchart of FIG. 4, upon receipt of inbound document data (step 42), the distiller attempts (using the CZipFile class) to open the input file as ZIP file (step 44). If the ZIP file does not open, then the data is not Office 2007 document data and is not supported by the distiller (step 46).

The distiller then tries to obtain the contents of the_rels/.rels file (step 48). If this file is not present then the document data does not relate to an Office 2007 XML document (step 46).

The distiller next tries to load and parse contents of the_rels/.rels file (step 50) thereby creating a map of name-value pairs (using the CDataXMLMap class). The_rels/.rel file is an entry map into the Office 2007 XML file and lists the name and location of the main file, thereby identifying what type of file it is. For example, the Word 2007 distiller checks whether there is a name-value pair with value "word/document.xml" (step 52), in which case the data relates to a Word 2007 XML file. The Excel 2007 distiller checks whether there is a pair with value "xl/workbook.xml" (step 54), in which case the data relates to a Excel 2007 XML file. The PowerPoint 2007 distiller checks whether there is a pair with value "ppt/presentation.xml" (step 56), in which case the data relates to a PowerPoint 2007 XML document. Otherwise, the data is not Office 2007 document data and is not supported by the distiller (step 46).

Next, the document data is parsed (step 58) and the Document Object Model DOM) is built (step 60). After the DOM has been constructed, then the system checks to see of there has been a command request to persist or store the constructed DOM (step 62). If yes, then the DOM data is stored in a document cache of the server 28 (step 63). The system then applies a decorator (step 64) for extracting contents or navigational information, etc. by traversing the DOM, and converting the DOM tree elements to USC format for transmission to the mobile communication device 12.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A server for creating a Document Object Model of an XML document of predetermined type, comprising:
    a memory; and
    a processor configured to execute a distiller, said distiller comprising:
        a first process for receiving and opening a compressed input file containing said XML document;
        a second process for opening and parsing the contents of a relationships file to create a map of name-value pairs and detecting a value for identifying said predetermined type from among a plurality of types of XML documents, wherein said second process includes a Data XML Map class for detecting (i) a name-value pair with a value for identifying a Word™ 2007 XML file, (ii) a name-value pair with a value for identifying an Excel™ 2007 XML file and (iii) a name-value pair with a value for identifying a PowerPoint™ 2007 XML document; and
        a further process for parsing data in said XML document according to said predetermined type, and building said Document Object Model for storage in said memory.

2. The server of claim 1, wherein said first process is a ZIP file class for unzipping said compressed input file.

3. The server of claim 1, wherein said further process includes a Data XML class.

4. The server of claim 1, wherein said relationships file is an Office Open XML rels/.rels file.

5. The server of claim 1, wherein said value for identifying a Word™ 2007 XML file is "word/document.xml", said value for identifying an Excel™ 2007 XML file is "xl/workbook.xml", and said value for identifying a PowerPoint™ 2007 XML document is "ppt/presentation.xml".

6. A method of creating a Document Object Model of an XML document of predetermined type, comprising:
    a first process for receiving and opening a compressed input file containing said XML document;
    a second process for opening and parsing the contents of a relationships file to create a map of name-value pairs and detecting a value for identifying said predetermined type from among a plurality of types of XML documents, wherein said second process includes a Data XML Map class for detecting (i) a name-value pair with a value for identifying a Word™ 2007 XML file, (ii) a name-value pair with a value for identifying an Excel™ 2007 XML file and (iii) a name-value pair with a value for identifying a PowerPoint™ 2007 XML document; and
    a further process for parsing data in said XML document according to said predetermined type, and building said Document Object Model.

7. The method of claim 6, wherein said first process is a ZIP file class for unzipping said compressed input file.

8. The method of claim 6, wherein said further process includes a Data XML class.

9. The method of claim 6 wherein said relationships file is an Office Open XML rels/.rels file.

10. The method of 1, wherein said value for identifying a Word™ 2007 XML file is "word/document.xml", said value for identifying an Excel™ 2007 XML file is "xl/workbook.xml", and said value for identifying a PowerPoint™ 2007 XML document is "ppt/presentation.xml".

* * * * *